(12) United States Patent
Kim et al.

(10) Patent No.: US 12,240,971 B2
(45) Date of Patent: Mar. 4, 2025

(54) THERMOPLASTIC RESIN COMPOSITION, METHOD OF PREPARING THE SAME, AND MOLDED ARTICLE INCLUDING THE SAME

(71) Applicant: LG CHEM, LTD., Seoul (KR)

(72) Inventors: Seongkyun Kim, Daejeon (KR); Seo Hwa Kim, Daejeon (KR); Byoung Il Kang, Daejeon (KR); Sejin Han, Daejeon (KR); Yeongmin Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 606 days.

(21) Appl. No.: 17/640,870

(22) PCT Filed: Aug. 17, 2021

(86) PCT No.: PCT/KR2021/010856
§ 371 (c)(1),
(2) Date: Mar. 7, 2022

(87) PCT Pub. No.: WO2022/080640
PCT Pub. Date: Apr. 21, 2022

(65) Prior Publication Data
US 2023/0151200 A1 May 18, 2023

(30) Foreign Application Priority Data

Oct. 14, 2020 (KR) .................. 10-2020-0132479

(51) Int. Cl.
| | | |
|---|---|---|
| *C08L 25/12* | (2006.01) | |
| *A01N 59/16* | (2006.01) | |
| *C08K 3/22* | (2006.01) | |
| *C08K 9/12* | (2006.01) | |

(52) U.S. Cl.
CPC .............. *C08L 25/12* (2013.01); *A01N 59/16* (2013.01); *C08K 3/22* (2013.01); *C08K 9/12* (2013.01); *C08K 2003/2296* (2013.01); *C08K 2201/006* (2013.01); *C08L 2205/03* (2013.01)

(58) Field of Classification Search
None
See application file for complete search history.

(56) References Cited

U.S. PATENT DOCUMENTS

| | | |
|---|---|---|
| 5,614,568 A | 3/1997 | Mawatari et al. |
| 2015/0050496 A1 | 2/2015 | Sueda et al. |
| 2018/0112056 A1 | 4/2018 | Yang et al. |
| 2019/0322854 A1 | 10/2019 | Yang et al. |
| 2021/0147671 A1 | 5/2021 | Yang et al. |
| 2022/0186019 A1 | 6/2022 | Eim |
| 2023/0151200 A1 | 5/2023 | Kim et al. |

FOREIGN PATENT DOCUMENTS

| | | |
|---|---|---|
| CN | 104 448 678 A | 3/2015 |
| CN | 106280218 A | 1/2017 |
| CN | 107974030 A | 5/2018 |
| CN | 110114405 A | 8/2019 |
| CN | 111087749 A | 5/2020 |
| CN | 111201279 A | 5/2020 |
| CN | 111363298 A | 7/2020 |
| JP | H05331345 A | 12/1993 |
| JP | H08208945 A | 8/1996 |
| JP | H08217936 A | 8/1996 |
| JP | H1135787 A | 2/1999 |
| JP | H11199667 A | 7/1999 |
| JP | H11263704 A | 9/1999 |
| JP | 2019-210281 A | 12/2019 |
| JP | 2020-526636 A | 8/2020 |
| JP | 2022-530473 A | 6/2022 |
| JP | 7385016 B2 | 11/2023 |
| KR | 10-2004-0054985 A | 6/2004 |
| KR | 10-2012-0113860 A | 10/2012 |
| KR | 10-2014-0009892 A | 1/2014 |
| KR | 10-2018-0077044 A | 7/2018 |
| KR | 10-1967961 B1 | 4/2019 |
| KR | 10-2019-0068509 A | 6/2019 |
| KR | 10-2019-0076244 A | 7/2019 |

(Continued)

OTHER PUBLICATIONS

Office Action issued in corresponding Japanese Patent Application No. 2022-517247, dated Apr. 17, 2023.

(Continued)

*Primary Examiner* — Robert T Butcher
(74) *Attorney, Agent, or Firm* — Morgan, Lewis & Bockius LLP

(57) ABSTRACT

Disclosed is a thermoplastic resin composition, a method of preparing the same, and a molded article including the same, including a thermoplastic resin composition including 100 parts by weight of a base resin (A) including a vinyl cyanide compound-conjugated diene compound-aromatic vinyl compound graft copolymer (A-1) and an aromatic vinyl compound-vinyl cyanide compound copolymer (A-2); 0.1 to 32 parts by weight of a polymer (B) having a weight average molecular weight of greater than 500,000 g/mol and containing an unshared electron pair; 0.1 to 5 parts by weight of an inorganic antibacterial agent (C) including one or more carriers selected from the group consisting of phosphate glass, silica gel, calcium phosphate, and zirconium sodium phosphate; and 0.2 to 10 parts by weight of zinc oxide (D) having a BET surface area of 28 m$^2$/g or more, a method of preparing the thermoplastic resin composition, and a molded article including the thermoplastic resin composition.

14 Claims, No Drawings

(56) References Cited

FOREIGN PATENT DOCUMENTS

WO      2013/133412 A1    9/2013
WO      2018/124657 A1    7/2018
WO      2019/066193 A1    4/2019

OTHER PUBLICATIONS

Supplementary European Search Report dated Sep. 19, 2022 for related European Patent Application No. 21 85 6925, 5 pages.
TW Office Action issued in TW application 110131332 dated Aug. 20, 2024 (CN 106280218 A was previously cited).
Office Action issued in JP application 2023-190929 dated Sep. 27, 2024.
International Search Report and Written Opinion issued in corresponding International Patent Application No. PCT/KR2021/010856, dated Nov. 22, 2021.
First Office Action dated Sep. 15, 2023 from the CNIPA corresponding Chinese Patent Application No. 202180005362.8.

THERMOPLASTIC RESIN COMPOSITION, METHOD OF PREPARING THE SAME, AND MOLDED ARTICLE INCLUDING THE SAME

CROSS-REFERENCE TO RELATED APPLICATION

The present application is a U.S. National Stage of PCT/KR2021/010856, filed on Aug. 17, 2021, which claims priority to Korean Patent Application No. 10-2020-0132479, filed on Oct. 14, 2020 in the Korean Intellectual Property Office, the disclosure of each of which is incorporated herein by reference.

TECHNICAL FIELD

The present invention relates to a thermoplastic resin composition, a method of preparing the same, and a molded article including the same. More specifically, the thermoplastic resin composition of the present invention has no human toxicity, and has excellent thermal stability, initial antibacterial properties, and antibacterial sustainability. In addition, the thermoplastic resin composition has neither a gas defect nor exhibits a peeling phenomenon when being injected.

BACKGROUND ART

In recent years, as interest in personal health and hygiene and income levels increase, demand for thermoplastic resin products having an antibacterial function is increasing despite high prices thereof. Accordingly, demand for antibacterial thermoplastic resin products capable of removing bacteria or inhibiting bacterial activity from the surfaces of household goods and home appliances is increasing. In addition, development of functional antibacterial materials with improved stability and reliability is required.

To prepare an antibacterial ABS resin, an antibacterial agent must be added. In this case, antibacterial agents are classified into organic antibacterial agents and inorganic antibacterial agents.

The organic antibacterial agents have excellent initial antibacterial properties but are toxic to the human body. In addition, the organic antibacterial agents may be decomposed during high-temperature processing, thereby losing antibacterial effects thereof. In addition, the organic antibacterial agents have a short antibacterial sustainability, so application ranges thereof are extremely limited.

The inorganic antibacterial agents have excellent thermal stability but may be dispersed or discolored during processing. In addition, the inorganic antibacterial agents have low antibacterial sustainability due to rapid elution of antibacterial metal ions, and thus application ranges thereof are extremely limited.

Therefore, there is an urgent need to develop a thermoplastic resin having excellent initial antibacterial properties and antibacterial sustainability while efficiently doing the original function of the thermoplastic resin.

RELATED ART DOCUMENTS

Patent Documents

KR 10-2004-0054985 A

DISCLOSURE

Technical Problem

Therefore, the present invention has been made in view of the above problems, and it is one object of the present invention to provide a thermoplastic resin composition having no human toxicity, and having excellent thermal stability, initial antibacterial properties, and antibacterial sustainability; a method of preparing the same; and a molded article including the same. In addition to these advantages, the thermoplastic resin composition of the present invention neither has a gas defect nor exhibits a peeling phenomenon when being injected.

The above and other objects can be accomplished by the present invention described below.

Technical Solution

In accordance with one aspect of the present invention, provided is a thermoplastic resin composition including 100 parts by weight of a base resin (A) including a vinyl cyanide compound-conjugated diene compound-aromatic vinyl compound graft copolymer (A-1) and an aromatic vinyl compound-vinyl cyanide compound copolymer (A-2); 0.1 to 32 parts by weight of a polymer (B) having a weight average molecular weight of greater than 500,000 g/mol and containing an unshared electron pair; 0.1 to 5 parts by weight of an inorganic antibacterial agent (C) including one or more carriers selected from the group consisting of phosphate glass, silica gel, calcium phosphate, and zirconium sodium phosphate; and 0.2 to 10 parts by weight of zinc oxide (D) having a BET surface area of 28 $m^2/g$ or more.

In accordance with another aspect of the present invention, provided is a method of preparing a thermoplastic resin composition, the method including kneading and extruding 100 parts by weight of a base resin (A) including a vinyl cyanide compound-conjugated diene compound-aromatic vinyl compound graft copolymer (A-1) and an aromatic vinyl compound-vinyl cyanide compound copolymer (A-2); 0.1 to 32 parts by weight of a polymer (B) having a weight average molecular weight of greater than 500,000 g/mol and containing an unshared electron pair; 0.1 to 5 parts by weight of an inorganic antibacterial agent (C) including one or more carriers selected from the group consisting of phosphate glass, silica gel, calcium phosphate, and zirconium sodium phosphate; and 0.2 to 10 parts by weight of zinc oxide (D) having a BET surface area of 28 $m^2/g$ or more.

In accordance with yet another aspect of the present invention, provided is a molded article including the thermoplastic resin composition of the present invention.

Advantageous Effects

The present invention has an effect of providing a thermoplastic resin composition, a method of preparing the same, and a molded article including the same. According to the present invention, the thermoplastic resin composition has no human toxicity, and has excellent thermal stability, initial antibacterial properties, and antibacterial sustainability. In addition, the thermoplastic resin composition neither has gas-induced defects nor exhibits a peeling phenomenon when being injected.

BEST MODE

Hereinafter, a thermoplastic resin composition of the present invention, a method of preparing the same, and a molded article including the same will be described in detail.

The present inventors confirmed that, when a polymer having poor antibacterial sustainability alone, having a weight average molecular weight of greater than 500,000 g/mol, and containing unshared electron pair; an inorganic antibacterial agent including one or more carriers selected from the group consisting of phosphate glass, silica gel, calcium phosphate, and zirconium sodium phosphate; and zinc oxide having a predetermined BET surface area were added to a base resin including a vinyl cyanide compound-conjugated diene compound-aromatic vinyl compound graft copolymer and an aromatic vinyl compound-vinyl cyanide compound copolymer in a predetermined content ratio, due to a synergistic effect by organic bonding between the water-soluble inorganic antibacterial agent and the water-insoluble zinc oxide and coordinate covalent bonding with metal ions by the unshared electron pairs of the poly(ether ester amide) resin, the elution rate of the metal ions was reduced, thereby significantly increasing initial antibacterial properties and antibacterial sustainability. Based on these results, the present inventors conducted further studies to complete the present invention.

The thermoplastic resin composition of the present invention includes 100 parts by weight of a base resin (A) including a vinyl cyanide compound-conjugated diene compound-aromatic vinyl compound graft copolymer (A-1) and an aromatic vinyl compound-vinyl cyanide compound copolymer (A-2); 0.1 to 32 parts by weight of a polymer (B) having a weight average molecular weight of greater than 500,000 g/mol and containing unshared electron pair; 0.1 to 5 parts by weight of an inorganic antibacterial agent (C) including one or more carriers selected from the group consisting of phosphate glass, silica gel, calcium phosphate, and zirconium sodium phosphate; and 0.2 to 10 parts by weight of zinc oxide (D) having a BET surface area of 28 $m^2/g$ or more. In this case, the thermoplastic resin composition has no human toxicity, and has excellent thermal stability, initial antibacterial properties, and antibacterial sustainability. In addition, the thermoplastic resin composition has neither a gas defect nor exhibits a peeling phenomenon when being injected.

Hereinafter, each component constituting the thermoplastic resin composition of the present invention will be described in detail as follows.

A-1) Vinyl Cyanide Compound-Conjugated Diene Compound-Aromatic Vinyl Compound Graft Copolymer Based on a total weight of the base resin, the vinyl cyanide compound-conjugated diene compound-aromatic vinyl compound graft copolymer (A-1) is preferably included in an amount of 20 to 40% by weight, more preferably 20 to 35% by weight, still more preferably 25 to 35% by weight, still more preferably 25 to 30% by weight.

The vinyl cyanide compound-conjugated diene compound-aromatic vinyl compound graft copolymer (A-1) is preferably a copolymer prepared by graft-polymerizing a vinyl cyanide compound and an aromatic vinyl compound onto conjugated diene rubber including a conjugated diene compound.

The conjugated diene rubber preferably has an average particle diameter of 0.05 to 0.5 μm, more preferably 0.2 to 0.5 μm, still more preferably 0.25 to 0.45 μm, still more preferably 0.3 μm to 0.4 μm.

In this description, average particle diameter may be measured by dynamic light scattering, and specifically, may be measured as an intensity value using a Nicomp 380 particle size analyzer (manufacturer: PSS) in a Gaussian mode.

In addition, in this description, the average particle diameter may be an arithmetic average particle diameter in a particle size distribution measured by dynamic light scattering, specifically, a scattering intensity average particle diameter.

For example, the vinyl cyanide compound may include one or more selected from the group consisting of acrylonitrile, methacrylonitrile, ethylacrylonitrile, and derivatives thereof, preferably acrylonitrile.

In this description, a derivative of a compound may refer to a substance obtained by substituting at least one hydrogen of the compound with another type of group such as an alkyl group or a halogen group.

Based on a total weight of the graft copolymer (A-1) the vinyl cyanide compound is preferably included in an amount of 3 to 25% by weight, more preferably 5 to 20% by weight.

For example, the conjugated diene compound may include one or more selected from the group consisting of 1,3-butadiene, isoprene, chloroprene, and piperylene, preferably 1,3-butadiene.

Based on a total weight of the graft copolymer (A-1) the conjugated diene compound is preferably included in an amount of 50 to 80% by weight, more preferably 55 to 70% by weight.

The conjugated diene rubber refers to a polymer or a copolymer prepared by polymerizing a conjugated diene compound having a structure in which a double bond and a single bond are alternately arranged. Preferably, the conjugated diene rubber includes one or more selected from the group consisting of a butadiene polymer, a butadiene-styrene copolymer, and a butadiene-acrylonitrile copolymer.

For example, the aromatic vinyl compound may include one or more selected from the group consisting of styrene, α-methylstyrene, p-methylstyrene, o-ethylstyrene, p-ethylstyrene, vinyltoluene, and derivatives thereof.

Based on a total weight of the graft copolymer (A-1) the aromatic vinyl compound is preferably included in an amount of 25 to 50% by weight, more preferably 25 to 40% by weight.

The graft copolymer (A-1) may be prepared by a preparation method commonly used in the art without particularly limitation. Preferably, the graft copolymer (A-1) is prepared by emulsion polymerization. In this case, due to increased grafting efficiency, mechanical properties and processability may be excellent.

A-2) Aromatic Vinyl Compound-Vinyl Cyanide Compound Copolymer

The aromatic vinyl compound-vinyl cyanide compound copolymer (A-2) of the present invention is preferably included in an amount of 60 to 80% by weight, more preferably 65 to 80% by weight, still more preferably 65 to 75% by weight, still more preferably 70 to 75% by weight.

The aromatic vinyl compound-vinyl cyanide compound copolymer (A-2) preferably is a copolymer including 55 to 85% by weight of an aromatic vinyl compound and 15 to 45% by weight of a vinyl cyanide compound, more preferably a copolymer including 55 to 75% by weight of an aromatic vinyl compound and 25 to 45% by weight of a vinyl cyanide compound, still more preferably a copolymer including 60 to 70% by weight of an aromatic vinyl compound and 30 to 40% by weight of a vinyl cyanide compound.

For example, the aromatic vinyl compound may include one or more selected from the group consisting of styrene, α-methylstyrene, p-methylstyrene, o-ethylstyrene, p-ethylstyrene, vinyltoluene, and derivatives thereof, preferably styrene.

For example, the vinyl cyanide compound may include one or more selected from the group consisting of acrylonitrile, methacrylonitrile, ethylacrylonitrile, and derivatives thereof, preferably acrylonitrile.

The aromatic vinyl compound-vinyl cyanide compound copolymer (A-2) preferably has a weight average molecular weight of 50,000 to 200,000 g/mol, more preferably 60,000 to 180,000 g/mol, still more preferably 70,000 to 150,000 g/mol.

In this description, for example, when weight average molecular weight is measured, a resin is dissolved in tetrahydrofuran (THF) to a concentration of 1 mg/ml and filtered using a 0.45 μm syringe filer. Then, weight average molecular weight is measured by gel permeation chromatography (GPC).

The aromatic vinyl compound-vinyl cyanide compound copolymer (A-2) may be prepared by a preparation method commonly used in the art without particularly limitation. Preferably, the aromatic vinyl compound-vinyl cyanide compound copolymer (A-2) is prepared by continuous bulk polymerization. In this case, preparation cost may be reduced, and mechanical properties may be excellent.

B) Polymer Containing Unshared Electron Pair

For example, based on 100 parts by weight of the base resin, the polymer (B) containing unshared electron pairs of the present invention may be included in an amount of 0.1 to 32 parts by weight, preferably 0.1 to 30 parts by weight. Within this range, the elution rate of metal ions from the inorganic antibacterial agent and the zinc oxide may be greatly reduced, thereby greatly increasing antibacterial sustainability. In this case, by coordinate covalent bonding between the inorganic antibacterial agent and the unshared electron pairs of the poly(ether ester amide) resin and coordinate covalent bonding between the metal ions of the zinc oxide and the unshared electron pairs of the poly(ether ester amide) resin, a rate at which the metal ions are eluted from the thermoplastic resin composition may be greatly reduced, thereby improving antibacterial sustainability.

The polymer (B) containing unshared electron pairs preferably has a weight average molecular weight of greater than 500,000 g/mol, more preferably 510,000 g/mol or more, still more preferably 600,000 g/mol or more, still more preferably 660,000 g/mol or more, still more preferably 700,000 g/mol or more, as a specific example, a weight average molecular weight of greater than 500,000 g/mol and less than or equal to 1,000,000 g/mol, as a preferred example, 510,000 to 1,000,000 g/mol, as a more preferred example, 600,000 to 1,000,000 g/mol, as a still more preferred example, 660,000 to 1,000,000 g/mol as measured by gel permeation chromatography (GPC). Within this range, the elution rate of metal ions from the inorganic antibacterial agent and the zinc oxide may be greatly reduced, thereby greatly increasing antibacterial sustainability.

When the polymer (B) containing unshared electron pairs is subjected to $^{13}C$ NMR measurement, a ratio B/A of a sum B of integral values of peaks corresponding to a hydroxyl group, an ether group, an ester group, and an amide group to a sum A of integral values of $CH_2$ peaks may be 0.01 to 1.0, preferably 0.1 to 1.0, more preferably 0.2 to 0.9, still more preferably 0.3 to 0.9, still more preferably 0.3 to 0.6. Within this range, the elution rate of metal ions from the inorganic antibacterial agent and the zinc oxide may be greatly reduced, thereby greatly increasing antibacterial sustainability.

The polymer (B) containing unshared electron pair is a generic term for polymers having at least one of ether, ester, amide, amine, and hydroxyl functional groups. For example, the polymer (B) may include one or more selected from the group consisting of a poly(ether ester amide) resin, a poly(ether amide) block copolymer, a poly(ester amide) block copolymer, a poly(ether ester) block copolymer, a polyether resin, a polyester resin, and a polyamide resin. Within this range, the elution rate of metal ions from the inorganic antibacterial agent and the zinc oxide may be greatly reduced, thereby greatly increasing antibacterial sustainability.

Resins or copolymers commonly used in the art to which the present invention pertains may be used as the poly(ether ester amide) resin, the poly(ether amide) block copolymer, the poly(ester amide) block copolymer, the poly(ether ester) block copolymer, the polyether resin, the polyester resin, and the polyamide resin as long as the resins and the copolymers follow the definition of the present invention, without particular limitation.

The polyamide resin preferably includes nylon6, nylon66, or mixtures thereof.

For example, the poly(ether ester amide) resin may be a poly(ether ester amide) block copolymer, preferably an amino carboxylic acid, lactam, or diamine-dicarboxylate having 6 or more carbon atoms; and a block copolymer of a reaction mixture including a polyalkylene glycol and, when necessary, a dicarboxylic acid having 4 to 20 carbon atoms.

For example, the amino carboxylic acid, lactam, or diamine-dicarboxylate having 6 or more carbon atoms may include one or more selected from the group consisting of aminocarboxylic acids such as ω-aminocaproic acid, ω-aminoenanthic acid, ω-aminocaprylic acid, ω-aminopelcoric acid, ω-aminocapric acid, 1,1-aminoundecanoic acid, 1,2-aminododecanoic acid; lactams such as caprolactam, enanthlactam, caprylactam, lauryllactam; and diamine-dicarboxylates such as hexamethylenediamine-adipate and hexamethylenediamine-isophthalate, preferably includes one or more selected from the group consisting of 1,2-aminododecanoic acid, caprolactam, and hexamethylenediamine-adipate.

For example, the polyalkylene glycol may include one or more selected from the group consisting of polyethylene glycol, poly(1,2- and 1,3-propylene glycol), polytetramethylene glycol, polyhexamethylene glycol, a block or random copolymer of ethylene glycol and propylene glycol, and a copolymer of ethylene glycol and tetrahydrofuran, preferably includes polyethylene glycol, a copolymer of ethylene glycol and propylene glycol, or mixtures thereof.

For example, the dicarboxylic acid having 4 to 20 carbon atoms may include one or more selected from the group consisting of terephthalic acid, 1,4-cyclohexacarboxylic acid, sebacic acid, adipic acid, and dodecanocarboxylic acid.

As another example, the bond between the amino carboxylic acid, lactam, or diamine-dicarboxylate having 6 or more carbon atoms and the polyalkylene glycol is an ester bond, the bond between the amino carboxylic acid, lactam, or diamine-dicarboxylate having 6 or more carbon atoms and the dicarboxylic acid having 4 to 20 carbon atoms is an amide bond, and the bond between the polyalkylene glycol and the dicarboxylic acid having 4 to 20 carbon atoms is an ester bond.

For example, the poly(ether ester amide) resin may be a block copolymer including 5 to 95% by weight of an amino carboxylic acid, lactam, or diamine-dicarboxylate having 6 or more carbon atoms and 5 to 95% by weight of a polyalkylene glycol.

As another example, the poly(ether ester amide) resin may be a block copolymer including 5 to 65% by weight of an amino carboxylic acid, lactam, or diamine-dicarboxylate having 6 or more carbon atoms and 35 to 65% by weight of a polyalkylene glycol.

For example, based on 100 parts by weight in sum of the amino carboxylic acid, lactam, or diamine-dicarboxylate having 6 or more carbon atoms and the polyalkylene glycol, the poly(ether ester amide) resin may include 70 parts by weight or less, more preferably 5 to 65 parts by weight of a dicarboxylic acid having 4 to 20 carbon atoms.

The polymer (B) containing unshared electron pairs may be prepared without particularly limitation by a synthesis method commonly used in the art to which the present invention pertains if the synthesis method follows the definition of the present invention.

C) Inorganic Antibacterial Agent

Based on 100 parts by weight of the base resin, the inorganic antibacterial agent (C) of the present invention is preferably included in an amount of 0.1 to 5 parts by weight, more preferably 0.1 to 3 parts by weight, still more preferably 0.1 to 1 part by weight, still more preferably 0.1 to 0.9 parts by weight, still more preferably 0.1 to 0.5 parts by weight, still more preferably 0.2 to 0.5 parts by weight, most preferably 0.2 to 0.4 parts by weight.

In this description, the inorganic antibacterial agent is preferably an inorganic antibacterial agent including one or more carriers selected from the group consisting of phosphate glass, silica gel, calcium phosphate, and zirconium sodium phosphate, and is prepared by partially or completely substituting exchangeable ions in the carrier with silver, zinc, copper, mercury, or tin ions, etc., which are antibacterial metal ions (active ingredients).

The inorganic antibacterial agent (C) preferably includes one or more selected from the group consisting of a silver (Ag)-based inorganic antibacterial agent; a zinc (Zn)-based inorganic antibacterial agent; and an inorganic antibacterial agent based on a mixture of silver and zinc.

As the silver (Ag)-based inorganic antibacterial agent, an inorganic antibacterial agent containing a silver component may be used without particularly limitation. Preferably, the silver (Ag)-based inorganic antibacterial agent is a carrier containing a silver component.

As the zinc (Zn)-based inorganic antibacterial agent, an inorganic antibacterial agent containing a zinc component may be used without particularly limitation. Preferably, the zinc (Zn)-based inorganic antibacterial agent is a carrier containing a zinc component.

As the inorganic antibacterial agent based on a mixture of silver and zinc, an inorganic antibacterial agent containing silver and zinc components may be used without particularly limitation. Preferably, the inorganic antibacterial agent based on a mixture of silver and zinc is a carrier containing silver and zinc components.

The silver and zinc components are the active ingredients of the inorganic antibacterial agent. Based on a total weight of the inorganic antibacterial agent, the silver and zinc components are preferably included in an amount of 0.1 to 5% by weight, more preferably 1 to 5% by weight, still more preferably 2 to 5% by weight.

In the carrier, the active ingredients are preferably ionized.

The carrier preferably includes one or more selected from the group consisting of zeolite, phosphate glass, silica gel, calcium phosphate, zirconium phosphate, and zirconium sodium phosphate. More preferably, the carrier is phosphate glass, silica gel, or a mixture thereof.

D) Zinc Oxide Having BET Surface Area of 28 $m^2/g$ or More

For example, based on 100 parts by weight in total of the base resin, the zinc oxide (D) having a BET surface area of 28 $m^2/g$ or more of the present invention may be included in an amount of 0.2 to 10 parts by weight, preferably 0.4 to 10 parts by weight, more preferably 0.4 to 5 parts by weight, still more preferably 0.4 to 4.5 parts by weight, still more preferably 0.5 to 4 parts by weight.

The zinc oxide (D) preferably has a BET surface area of 28 to 50 $m^2/g$, more preferably 30 to 50 $m^2/g$, still more preferably 30 to 45 $m^2/g$, still more preferably 35 to 45 $m^2/g$.

In this description, the BET surface area may be measured using BET analysis equipment (surface area and porosity analyzer ASAP 2020, Micromeritics Co.) according to a nitrogen gas adsorption method.

As the zinc oxide (D) having a BET surface area of 28 $m^2/g$ or more, zinc oxide commonly used in the art to which the present invention pertains may be used without particularly limitation if the zinc oxide follows the definition of the present invention.

Thermoplastic Resin Composition

For example, after pretreatment according to the JIS Z 2801 antibacterial evaluation method, the thermoplastic resin composition of the present invention may have an antibacterial durability of 2.0 or more, preferably 2.5 or more, more preferably 2.8 or more, as a specific example, 2.5 to 7, as a preferred example, 2.8 to 7.

For example, after acid treatment according to the JIS Z 2801 antibacterial evaluation method, the thermoplastic resin composition may have an antibacterial sustainability of 2.0 or more, preferably 2.4 or more, as a preferred example, 2.4 to 7.

For example, after alkali treatment according to the JIS Z 2801 antibacterial evaluation method, the thermoplastic resin composition may have an antibacterial sustainability of 2.0 or more, preferably 2.2 or more, more preferably 2.3 or more, as a preferred example, 2.2 to 7, as a more preferred example, 2.3 to 7.

The thermoplastic resin composition is preferably used as a material for home appliances or household goods, more preferably a material for home appliances.

When necessary, the thermoplastic resin composition may further include 0.01 to 5 parts by weight, 0.05 to 3 parts by weight, 0.1 to 2 parts by weight, or 0.5 to 1 part by weight of one or more selected from the group consisting of a heat stabilizer, a light stabilizer, a dye, a colorant, a release agent, an antistatic agent, a processing aid, a metal deactivator, a flame retardant, a smoke suppressant, an anti-drip agent, an anti-friction agent, and an anti-wear agent. Within this range, the required physical properties of the thermoplastic resin composition of the present invention may be implemented without deterioration in the intrinsic physical properties thereof.

Method of Preparing Thermoplastic Resin Composition

A method of preparing the thermoplastic resin composition of the present invention includes a step of kneading and extruding 100 parts by weight of a base resin (A) including a vinyl cyanide compound-conjugated diene compound-aromatic vinyl compound graft copolymer (A-1) and an aromatic vinyl compound-vinyl cyanide compound copolymer (A-2); 0.1 to 32 parts by weight of a polymer (B) having a weight average molecular weight of greater than 500,000 g/mol and containing unshared electron pair; 0.1 to 5 parts by weight of an inorganic antibacterial agent (C) including one or more carriers selected from the group consisting of phosphate glass, silica gel, calcium phosphate, and zirconium sodium phosphate; and 0.4 to 10 parts by weight of the zinc oxide (D) having a BET surface area of 28 $m^2/g$ or more. In this case, the thermoplastic resin composition has no human toxicity, and has excellent thermal stability, initial antibacterial properties, and antibacterial sustainability. In addition, the thermoplastic resin composition has neither a gas defect nor exhibits a peeling phenomenon when being injected.

The step of kneading and extruding is preferably performed at 210 to 280° C., more preferably 220 to 250° C. In this case, the temperature means a cylinder temperature.

As an extruder used in the step of kneading and extruding, an extruder commonly used in the art to which the present invention pertains may be used without particularly limitation. Preferably, a twin-screw extruder is used.

An extrudate obtained in the step of kneading and extruding preferably takes the form of pellets.

The method of preparing the thermoplastic resin composition shares all the technical characteristics of the above-described thermoplastic resin composition. Accordingly, repeated description thereof will be omitted.

Molded Article

A molded article of the present invention preferably includes the thermoplastic resin composition of the present invention. In this case, the molded article has no human toxicity, and has excellent thermal stability, initial antibacterial properties, and antibacterial durability. In addition, the molded article has neither a gas defect nor exhibits a peeling phenomenon when being injected.

For example, the molded article may be an extrusion-molded article or an injection-molded article, preferably an injection-molded article, more preferably a household article, a home appliance case, or a home appliance housing.

The molded article is preferably prepared by injecting the thermoplastic resin composition of the present invention at a molding temperature of 200 to 260° C., preferably 210 to 250° C. Within this range, there is an advantage of providing a molded article neither having a gas defect nor exhibiting a peeling phenomenon when being injected.

The thermoplastic resin composition used for injection may be in the form of pellets.

In the description of the thermoplastic resin composition of the present invention, the method of preparing the same, and the exterior material including the same, other conditions or equipment that are not explicitly described may be appropriately selected within the range commonly practiced in the art without particularly limitation.

Hereinafter, the present invention will be described in more detail with reference to the following preferred examples. However, these examples are provided for illustrative purposes only and should not be construed as limiting the scope and spirit of the present invention. In addition, it will be apparent to those skilled in the art that various changes and modifications may be made without departing from the spirit and scope of the present invention, and such changes and modifications are also within the scope of the appended claims.

EXAMPLES

Materials used in Examples 1 to 6 and Comparative Examples 1 to 14 below are as follows.

(A-1) An ABS resin (DP270M, LG Chemical Co.) having a rubber particle diameter of 0.3 μm was used as the ABS graft copolymer.

(A-2) 81HF (LG Chemical Co.) was used as the SAN copolymer.

(B-1) A poly(ether ester amide) resin having a weight average molecular weight of 800,000 g/mol and a ratio B/A of 0.4 of a sum B of integral values of peaks corresponding to a hydroxyl group, an ether group, an ester group, and an amide group to a sum A of integral values of $CH_2$ peaks upon $^{13}C$ NMR measurement was used.

(B-2) A poly(ether amide) resin having a weight average molecular weight of 4,500 g/mol and a ratio B/A of 0.3 was used.

(B-3) A polyvinyl alcohol (PVA) resin having a weight average molecular weight of 500,000 g/mol and a ratio B/A of 1 was used.

(C-1) A silver (Ag)-based inorganic antibacterial agent in which 3% by weight of an Ag component was supported on a phosphate glass carrier was used as the inorganic antibacterial agent.

(C-2) A silver (Ag)-based inorganic antibacterial agent (AGZ330, Toagosei Co.) in which 2% by weight of an Ag component was supported on a zirconium phosphate carrier was used as the inorganic antibacterial agent.

(C-3) A silver (Ag)-based inorganic antibacterial agent (DAW502, SHINANEN Co.) in which 5% by weight of an Ag component was supported on a zeolite carrier was used as the inorganic antibacterial agent.

(D-1) Zinc oxide having a BET surface area of 40 $m^2/g$ was used.

(D-2) Zinc oxide (KS-1, Tae kyung SBC Co.) having a BET surface area of 15 $m^2/g$ was used.

Here, when $^{13}C$ NMR measurement of (B-1), (B-2), and (B-3) was performed, a ratio B/A of a sum B of integral values of peaks corresponding to a hydroxyl group, an ether group, an ester group, and an amide group to a sum A of integral values of $CH_2$ peaks was measured by $^{13}C$ NMR.

Examples 1 to 6 and Comparative Examples 1 to 14

According to the compositions and contents shown in Table 1 below, each component was fed to a twin-screw extruder, and melt-kneading was performed at 230° C. to obtain a resin composition in pellet form. Then, the prepared resin composition in pellet form was injected at 230° C. to obtain a specimen for measuring physical properties.

Test Examples

The properties of the specimens prepared in Examples 1 to 6 and Comparative Examples 1 to 14 were measured according to the following methods, and the results are shown in Table 2 below.

Antibacterial activity: According to the JIS Z 2801 antibacterial evaluation method, 5 cm×5 cm specimens were inoculated with *E. coli* and *Staphylococcus aureus*, respectively. Then, incubation was performed at 35° C. and an RH of 90% for 24 hours, and then antibacterial activity was measured.

Antibacterial sustainability after pretreatment: According to the JIS Z 2801 antibacterial evaluation method, a specimen having a size of 5 cm×5 cm that had been immersed in 50° C. water for 32 hours was inoculated with *E. coli*, incubation was performed at 35° C. and an RH of 90% for 24 hours, and then antibacterial activity after pretreatment was measured.

Antibacterial sustainability after acid treatment: According to the JIS Z 2801 antibacterial evaluation method, a specimen having a size of 5 cm×5 cm that had been immersed in a 5% citric acid solution for 16 hours was inoculated with *E. coli*, incubation was performed at 35° C. and an RH of 90% for 24 hours, and then antibacterial activity after acid treatment was measured.

Antibacterial sustainability after alkali treatment: According to the JIS Z 2801 antibacterial evaluation method, a specimen having a size of 5 cm×5 cm that had been immersed in a 5% caustic soda solution for 16 hours was inoculated with *E. coli*, incubation was performed at 35° C. and an RH of 90% for 24 hours, and then antibacterial activity after alkali treatment was measured.

Injection properties: When there is no peeling phenomenon or gas defect, it was evaluated as good.

TABLE 1

| Parts by weight | Examples | | | | | |
|---|---|---|---|---|---|---|
| | 1 | 2 | 3 | 4 | 5 | 6 |
| (A-1) | 27 | 27 | 27 | 27 | 27 | 27 |
| (A-2) | 73 | 73 | 73 | 73 | 73 | 73 |
| (B-1) | 5 | 20 | 30 | 20 | 20 | 20 |
| (B-2) | — | — | — | — | — | — |
| (B-3) | — | — | — | — | — | — |
| (C-1) | 0.4 | 0.4 | 0.4 | 0.4 | 0.4 | 0.2 |
| (C-2) | — | — | — | — | — | — |
| (C-3) | — | — | — | — | — | — |
| (D-1) | 1 | 1 | 1 | 0.5 | 4 | 1 |
| (D-2) | — | — | — | — | — | — |

TABLE 2

| Parts by weight | Comparative Examples | | | | | | | | | | | | | |
|---|---|---|---|---|---|---|---|---|---|---|---|---|---|---|
| | 1 | 2 | 3 | 4 | 5 | 6 | 7 | 8 | 9 | 10 | 11 | 12 | 13 | 14 |
| (A-1) | 27 | 27 | 27 | 27 | 27 | 27 | 27 | 27 | 27 | 27 | 27 | 27 | 27 | 27 |
| (A-2) | 73 | 73 | 73 | 73 | 73 | 73 | 73 | 73 | 73 | 73 | 73 | 73 | 73 | 73 |
| (B-1) | 1 | 35 | 20 | — | 20 | 20 | — | — | — | — | 20 | 5 | 5 | 5 |
| (B-2) | — | — | — | — | — | — | — | — | 20 | — | — | — | — | — |
| (B-3) | — | — | — | — | — | — | — | — | — | 20 | — | — | — | — |
| (C-1) | 0.4 | 0.4 | 0.4 | 0.4 | — | 1 | 1 | — | 0.4 | 0.4 | 0.4 | 0.4 | — | — |
| (C-2) | — | — | — | — | — | — | — | — | — | — | — | — | 0.4 | — |
| (C-3) | — | — | — | — | — | — | — | — | — | — | — | — | — | 0.4 |
| (D-1) | 1 | 1 | 0.3 | 1 | 2 | — | — | 2 | 1 | 1 | — | 10 | 1 | 1 |
| (D-2) | — | — | — | — | — | — | — | — | — | — | 1 | — | — | — |

TABLE 3

| Classification | Examples | | | | | |
|---|---|---|---|---|---|---|
| | 1 | 2 | 3 | 4 | 5 | 6 |
| Antibacterial activity (E. coli) | 3.8 | 6.1 | 6.4 | 5.6 | 6.4 | 5.8 |
| Antibacterial activity (Staphylococcus aureus) | 4.2 | 6 | 6.1 | 5.3 | 6.4 | 5.2 |
| Antibacterial durability (after pretreatment) - E. coli | 2.8 | 3.7 | 4.9 | 4.1 | 6.4 | 3.8 |
| Antibacterial durability (after acid treatment) - E. coli | 2.4 | 3.8 | 4.9 | 4.3 | 6.4 | 3.6 |
| Antibacterial durability (after alkali treatment) - E. coli | 2.3 | 3.9 | 4.6 | 3.9 | 6.4 | 3.5 |
| Injection properties | Good | Good | Good | Good | Good | Good |
| Impact strength | 20 | 17 | 15 | 17 | 10 | 15 |

TABLE 4

| Classification | Comparative Examples | | | | | | | | | | | | | |
|---|---|---|---|---|---|---|---|---|---|---|---|---|---|---|
| | 1 | 2 | 3 | 4 | 5 | 6 | 7 | 8 | 9 | 10 | 11 | 12 | 13 | 14 |
| Antibacterial activity (E. coli) | 4.1 | X | 2.8 | 4.5 | 2.8 | 3.3 | 3.1 | 2.9 | 3.5 | X | 3.1 | 6.1 | 1.8 | 1.5 |
| Antibacterial activity (Staphylococcus aureus) | 4.5 | X | 2.6 | 4.1 | 2.4 | 3.1 | 3.0 | 3.2 | 3.8 | X | 2.3 | 6.1 | 1.6 | 1.3 |
| Antibacterial durability (after pretreatment) - E. coli | 2.1 | X | 2.1 | 1.8 | 1.2 | 1.9 | 0.8 | 0.9 | 1.8 | X | 1.5 | 6.1 | 0.8 | 0.5 |

TABLE 4-continued

| Classification | Comparative Examples | | | | | | | | | | | | | |
|---|---|---|---|---|---|---|---|---|---|---|---|---|---|---|
| | 1 | 2 | 3 | 4 | 5 | 6 | 7 | 8 | 9 | 10 | 11 | 12 | 13 | 14 |
| Antibacterial durability (after acid treatment) - E. coli | 1.5 | X | 1.4 | 1.6 | 1.1 | 2.3 | 0.6 | 1.2 | 1.5 | X | 1.2 | 6.1 | 0.4 | 0.2 |
| Antibacterial durability (after alkali treatment) - E. coli | 1.2 | X | 1.5 | 1.5 | 1.3 | 2.1 | 0.6 | 1.1 | 1.6 | X | 0.8 | 6.1 | 0.5 | 0.6 |
| Injection properties | Good | Peeling | Good | Good | Good | Good | Good | Good | Good | Gas defect and peeling | Good | Good | Good | Good |
| Impact strength | 22 | 12 | 16 | 22 | 16 | 17 | 18 | 17 | 17 | 10 | 17 | 5 | 19 | 19 |

As shown in Tables 3 and 4, the thermoplastic resin compositions (Examples 1 to 6) according to the present invention have no gas defect and no peeling when being injected and have excellent impact strength. In addition, initial antibacterial properties, antibacterial sustainability after pretreatment, antibacterial sustainability after acid treatment, and antibacterial sustainability after alkali treatment are all excellent. However, in the case of Comparative Example 1 in which a poly(ether ester amide) resin is included in an amount less than the content range according to the present invention, antibacterial sustainability is poor. In the case of Comparative Example 2 in which a poly(ether ester amide) resin is included in an amount exceeding the content range according to the present invention, due to deterioration in compatibility, peeling was observed, and antibacterial activity could not be measured.

In addition, in the case of Comparative Example 3 in which the zinc oxide is included in an amount less than the content range according to the present invention, initial antibacterial properties and antibacterial sustainability are both poor. In the case of Comparative Examples 4 to 8 in which the poly(ether ester amide) resin, the inorganic antibacterial agent, or the zinc oxide according to the present invention is not included, initial antibacterial properties and antibacterial sustainability are both poor.

In addition, in the case of Comparative Example 9 in which a poly(ether amide) resin is used instead of the poly(ether ester amide) resin according to the present invention, initial antibacterial properties and antibacterial sustainability are both poor. In the case of Comparative Example 10 in which a polyvinyl alcohol resin is used instead of the poly(ether ester amide) resin according to the present invention, due to a large number of hydroxyl groups, gas defects and peeling were observed on surface of an injection product.

In addition, in the case of Comparative Example 11 in which zinc oxide having a BET surface area of 15 m²/g is used instead of the zinc oxide according to the present invention, initial antibacterial properties and antibacterial sustainability are both poor.

In addition, in the case of Comparative Example 12 in which an excess of the zinc oxide is used, impact strength is greatly reduced, and thus the specimen is not suitable for use as a product. In the case of Comparative Examples 13 and 14 including a silver-based inorganic antibacterial agent in which zirconium phosphate or zeolite is used as a carrier, initial antibacterial properties, antibacterial sustainability after pretreatment, antibacterial sustainability after acid treatment, and antibacterial sustainability after alkali treatment are all poor.

The invention claimed is:

1. A thermoplastic resin composition, comprising:
   100 parts by weight of a base resin (A) comprising a vinyl cyanide compound-conjugated diene compound-aromatic vinyl compound graft copolymer (A-1) and an aromatic vinyl compound-vinyl cyanide compound copolymer (A-2);
   0.1 to 32 parts by weight of a polymer (B) having a weight average molecular weight of greater than 500,000 g/mol and containing an unshared electron pair;
   0.1 to 5 parts by weight of an inorganic antibacterial agent (C) comprising one or more carriers selected from the group consisting of phosphate glass, silica gel, calcium phosphate, and zirconium sodium phosphate; and
   0.2 to 10 parts by weight of zinc oxide (D) having a BET surface area of 28 m²/g or more.

2. The thermoplastic resin composition according to claim 1, wherein the base resin comprises 20 to 40% by weight of the vinyl cyanide compound-conjugated diene compound-aromatic vinyl compound graft copolymer (A-1) and 60 to 80% by weight of the aromatic vinyl compound-vinyl cyanide compound copolymer (A-2).

3. The thermoplastic resin composition according to claim 1, wherein the vinyl cyanide compound-conjugated diene compound-aromatic vinyl compound graft copolymer (A-1) comprises conjugated diene rubber comprising a conjugated diene compound having an average particle diameter of 0.05 to 0.5 μm.

4. The thermoplastic resin composition according to claim 1, wherein the aromatic vinyl compound-vinyl cyanide compound copolymer (A-2) comprises 65 to 80% by weight of an aromatic vinyl compound and 20 to 35% by weight of a vinyl cyanide compound.

5. The thermoplastic resin composition according to claim 1, wherein the polymer (B) containing the unshared electron pair comprises one or more selected from the group consisting of a poly(ether ester amide) resin, a poly(ether amide) block copolymer, a poly(ester amide) block copolymer, a poly(ether ester) block copolymer, a polyether resin, a polyester resin, and a polyamide resin.

6. The thermoplastic resin composition according to claim 1, wherein, when the polymer (B) containing unshared electron pairs is subjected to $^{13}$C NMR measurement, a ratio B/A of a sum B of integral values of peaks corresponding to a hydroxyl group, an ether group, an ester group, and an amide group to a sum A of integral values of $CH_2$ peaks is 0.01 to 1.0.

7. The thermoplastic resin composition according to claim 1, wherein the inorganic antibacterial agent (C) further comprises one or more selected from the group consisting of a silver (Ag)-based inorganic antibacterial agent; a zinc (Zn)-based inorganic antibacterial agent; and an inorganic antibacterial agent based comprising a mixture of silver and zinc.

8. The thermoplastic resin composition according to claim 7, wherein the inorganic antibacterial agent (C) comprises 0.1 to 5% by weight of silver and zinc as active ingredients based on a total weight of the inorganic antibacterial agent (C).

9. The thermoplastic resin composition according to claim 1, wherein the zinc oxide (D) has a BET surface area of 28 to 50 m$^2$/g.

10. The thermoplastic resin composition according to claim 1, wherein the thermoplastic resin composition has an antibacterial sustainability of 2.5 or more after pretreatment according to a JIS Z 2801 antibacterial evaluation method.

11. The thermoplastic resin composition according to claim 1, wherein the thermoplastic resin composition has an antibacterial sustainability of 2.4 or more after acid treatment according to a JIS Z 2801 antibacterial evaluation method.

12. The thermoplastic resin composition according to claim 1, wherein the thermoplastic resin composition has an antibacterial sustainability of 2.2 or more after alkali treatment according to a JIS Z 2801 antibacterial evaluation method.

13. A method of preparing a thermoplastic resin composition, comprising kneading and extruding 100 parts by weight of a base resin (A) comprising a vinyl cyanide compound-conjugated diene compound-aromatic vinyl compound graft copolymer (A-1) and an aromatic vinyl compound-vinyl cyanide compound copolymer (A-2); 0.1 to 32 parts by weight of a polymer (B) having a weight average molecular weight of greater than 500,000 g/mol and containing an unshared electron pair; 0.1 to 5 parts by weight of an inorganic antibacterial agent (C) comprising one or more carriers selected from the group consisting of phosphate glass, silica gel, calcium phosphate, and zirconium sodium phosphate; and 0.2 to 10 parts by weight of zinc oxide (D) having a BET surface area of 28 m$^2$/g or more.

14. A molded article, comprising the thermoplastic resin composition according to claim 1.

* * * * *